United States Patent
Kozaki et al.

(10) Patent No.: US 9,948,799 B2
(45) Date of Patent: Apr. 17, 2018

(54) IMAGE READING APPARATUS

(71) Applicant: SEIKO EPSON CORPORATION, Tokyo (JP)

(72) Inventors: Kohei Kozaki, Matsumoto (JP); Kensuke Tamai, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/352,296

(22) Filed: Nov. 15, 2016

(65) Prior Publication Data
US 2017/0142270 A1    May 18, 2017

(30) Foreign Application Priority Data

Nov. 16, 2015   (JP) ................................. 2015-223675

(51) Int. Cl.
| | |
|---|---|
| *H04N 1/04* | (2006.01) |
| *H04N 1/00* | (2006.01) |
| *H04N 1/10* | (2006.01) |

(52) U.S. Cl.
CPC ....... *H04N 1/00525* (2013.01); *H04N 1/0083* (2013.01); *H04N 1/00907* (2013.01); *H04N 1/1013* (2013.01); *H04N 1/1061* (2013.01); *H04N 2201/0081* (2013.01)

(58) Field of Classification Search
CPC ............. H04N 1/00525; H04N 1/0083; H04N 1/00907; H04N 1/1013; H04N 1/1061; H04N 2201/0081
USPC ....... 358/497, 494, 474, 505, 501, 401, 471; 250/234–236, 239; 399/211, 212
See application file for complete search history.

(56) References Cited

U.S. PATENT DOCUMENTS

| | | | | |
|---|---|---|---|---|
| 6,002,508 A | * | 12/1999 | Mai ..................... | H04N 1/00236 358/483 |
| 7,161,716 B1 | * | 1/2007 | Kawasaki ............ | H04N 1/1017 355/75 |
| 7,529,501 B2 | * | 5/2009 | Ishii ................... | G03G 15/6573 347/108 |
| 2003/0147105 A1 | | 8/2003 | Yamauchi | |
| 2008/0074716 A1 | | 3/2008 | Yoshihisa | |

(Continued)

FOREIGN PATENT DOCUMENTS

| | | |
|---|---|---|
| JP | 2003-233138 | 8/2003 |
| JP | 2004-095569 | 3/2004 |

(Continued)

*Primary Examiner* — Cheukfan Lee
(74) *Attorney, Agent, or Firm* — Workman Nydegger

(57) ABSTRACT

An image reading apparatus includes a medium reading unit that extends in a main scanning direction and reads an image of a medium while moving in a sub-scanning direction which is a direction crossing the main scanning direction; a signal transmission cable that is a flexible cable having a curved section and connected to the medium reading unit and that deforms following a movement of the medium reading unit; a power supply that supplies power to the medium reading unit; and a housing that accommodates the medium reading unit and the power supply. At least a portion of an insertion/extraction space for inserting/extracting a plug of a power cable from outside the housing to the power supply and at least a portion of an area where the signal transmission cable deforms following the movement of the medium reading unit overlap in a height direction of the medium reading unit.

11 Claims, 8 Drawing Sheets

(56) References Cited

U.S. PATENT DOCUMENTS

| | | | | |
|---|---|---|---|---|
| 2014/0168680 A1* | 6/2014 | Shiomi | ............. | H04N 1/00907 358/1.13 |
| 2014/0211280 A1* | 7/2014 | Yamasaki | ............ | H04N 1/1026 358/497 |
| 2014/0376068 A1* | 12/2014 | Imoto | .................. | H04N 1/1026 358/497 |
| 2015/0281483 A1* | 10/2015 | Shiomi | ............. | H04N 1/00559 358/474 |
| 2016/0014289 A1* | 1/2016 | Tamai | ............... | H04N 1/00549 358/474 |
| 2016/0295060 A1* | 10/2016 | Takahashi | .......... | H04N 1/02815 |
| 2017/0031300 A1* | 2/2017 | Fukuda | ................... | B41J 29/00 |
| 2017/0155782 A1* | 6/2017 | Okazawa | ........... | H04N 1/00554 |

FOREIGN PATENT DOCUMENTS

| | | | | |
|---|---|---|---|---|
| JP | 2008-107805 | | 5/2008 | |
| JP | 2010054126 A | * | 3/2010 | |

* cited by examiner

IMAGE READING APPARATUS

BACKGROUND

1. Technical Field

The present invention relates to an image reading apparatus such as a scanner.

2. Related Art

An image reading apparatus in which a document is placed on a scanner glass and in which an image reading unit with an image sensor moves below the scanner glass to read an image of the document is known. Such an image reading apparatus is called a flatbed-type scanner, examples of which are disclosed in JP-A-2008-107805 and JP-A-2003-233138. The image sensor has a certain length so as to cover the document width. Generally, the longitudinal direction of the image sensor is referred to as a "main scanning direction" and the moving direction, which is a direction orthogonal to the main scanning direction, is referred to as a "sub-scanning direction".

In a flatbed-type scanner, an image sensor and a circuit board (control section) are connected by a cable having flexibility, for example, a flexible flat cable. The flexible flat cable, as disclosed in JP-A-2003-233138, moves while forming a curved section therein. The flexible flat cable is configured to deform following the operational movement of the image sensor.

In an electric device, a power cable is connected to an AC inlet provided on the side of the apparatus. Such a configuration in which the AC inlet is provided on the side of the apparatus, for example, is disclosed in JP-A-2004-095569.

In recent years, although size reduction of an image reading apparatus has been increasingly demanded, there is still room for further size reduction. In particular, with the arrangement of an AC inlet, there is room for more improvement in terms of size reduction.

SUMMARY

An advantage of some aspects of the invention is that an image reading apparatus for which further consideration has been given to the size reduction of the apparatus is provided.

An image reading apparatus according to an aspect of the invention includes a medium reading unit that extends in a main scanning direction and reads an image of a medium while moving in a sub-scanning direction which is a direction crossing the main scanning direction, a signal transmission cable that is a flexible cable having a curved section and connected to the medium reading unit and that deforms following an operational movement of the medium reading unit, a power supply that supplies power to the medium reading unit, and a housing that accommodates the medium reading unit and the power supply. In the image reading apparatus, at least a portion of an insertion/extraction space for inserting/extracting a plug of a power cable from outside the housing to the power supply and at least a portion of an area in which the signal transmission cable deforms following the operational movement of the medium reading unit overlap in a height direction of the medium reading unit.

According to the aspect, in the height direction, at least a portion of the insertion/extraction space for inserting/extracting the plug of the power cable from outside the housing to the power supply and at least a portion of the area in which the signal transmission cable deforms following the operational movement of the medium reading unit overlap. Therefore, by avoiding the superimposition of the insertion/extraction space and the area in which the signal transmission cable deforms following the operational movement of the medium reading unit in the image reading apparatus in which the power supply is installed within the housing, the dimension of the height direction of the image reading apparatus will be reduced. Thus, it is possible to further reduce the thickness of the apparatus.

In the image reading apparatus according to the aspect, the image reading apparatus may further include a circuit board; and the signal transmission cable may include an analog signal transmission cable extending from one side of the medium reading unit in the main scanning direction and a digital signal transmission cable extending from the other side of the medium reading unit in the main scanning direction; the analog signal transmission cable and the digital signal transmission cable may be connected to the circuit board; and the analog signal transmission cable may be connected to the circuit board via a bypass path distant from the power supply.

According to such an image reading apparatus, the analog signal transmission cable is connected to the circuit board via the bypass path distant from the power supply. Therefore, upon transmission of analog signals susceptible to the influence of noise, it is possible to suppress the influence of noise originating from the power supply. Thus, it is possible to perform more efficient signal transmission.

In the image reading apparatus according to the aspect, in the height direction of the image reading apparatus, at least a portion of the insertion/extraction space and at least a portion of the circuit board may overlap in the height direction of the image reading apparatus.

According to such an image reading apparatus, since at least a portion of the insertion/extraction space and at least a portion of the circuit board overlap in the height direction of the image reading apparatus, it is possible to avoid the superimposition of the insertion/extraction space and the circuit board so that the height of the apparatus may be reduced. Thus, it is possible to further reduce the thickness of the apparatus.

In the image reading apparatus according to the aspect, the power supply may be arranged outside the movement area of the medium reading unit in the sub-scanning direction and at least a portion of a driving motor for driving the medium reading unit and at least a portion of the power supply may overlap in the sub-scanning direction.

According to such an image reading apparatus, at least a portion of the driving motor for driving the medium reading unit and at least a portion of the power supply overlap in the sub-scanning direction. Therefore, it is possible to avoid the superimposition of the driving motor and the power supply in the sub-scanning direction to further reduce the thickness of the apparatus.

In the image reading apparatus according to the aspect, an insertion/extraction opening provided in the insertion/extraction space to which the plug of the power cable is inserted/extracted may be provided at a position recessed from the side surface of the housing.

According to such an image reading apparatus, since the insertion/extraction opening provided in the insertion/extraction space to which the plug of the power cable is inserted/extracted is provided at a position recessed from the side surface of the housing, protrusion of the plug from the side surface of the housing may be avoided, or it may be possible to reduce the amount of protrusion of the plug. As a result, the side surface of the housing may be shifted towards a wall surface or the like, making it possible to decrease the amount of space required to install the apparatus.

In the image reading apparatus according to the aspect, the insertion/extraction opening may open in a direction intersecting the side surface of the housing in which the insertion/extraction space is provided.

According to such an image reading apparatus, since the insertion/extraction opening opens in the direction intersecting the side surface of the housing in which the insertion/extraction space is provided, protrusion of the plug from the side surface of the housing may be more reliably avoided, or the amount of protrusion of the plug may be further reduced. As a result, it is possible to further decrease the amount of space required to install the apparatus.

In the image reading apparatus according to the aspect, the housing may include a partition wall in the interior that separates the movement area of the medium reading unit and the arrangement region of the power supply while surrounding the movement area of the medium reading unit.

The power supply is liable to become an entry section through which dust and the like enter the apparatus, because of the insertion and extraction of the plug of the power cable. However, according to such an image reading apparatus, the housing includes a partition wall in the interior that separates the movement area of the medium reading unit and the arrangement region of the power supply while surrounding the movement area of the medium reading unit. Therefore, it is possible to suppress the entry of dust or the like into the interior of the medium reading unit from the power supply. Thus, the apparatus may be maintained in an efficient condition.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
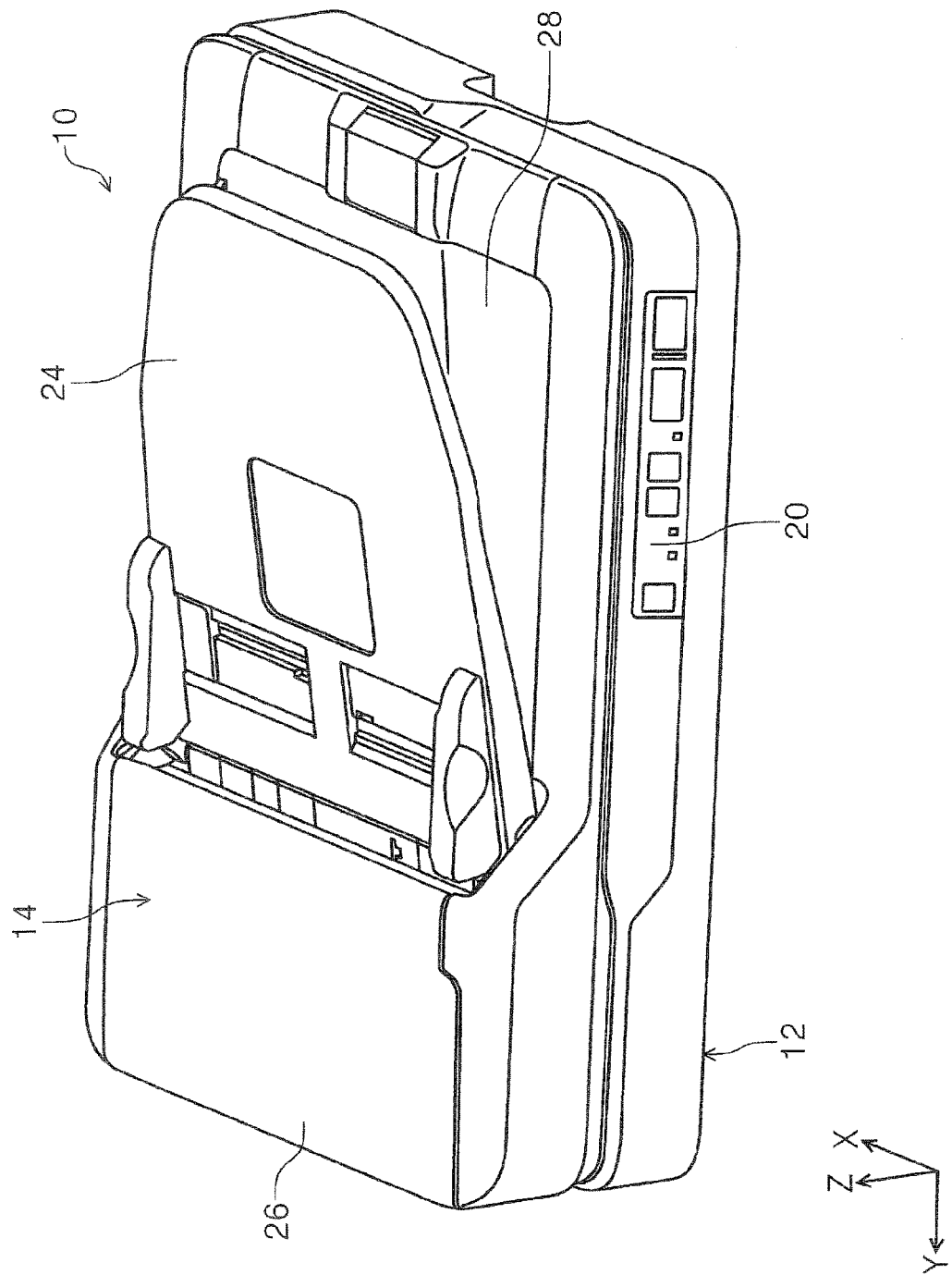
FIG. 1 is an external perspective view of an image reading apparatus according to the invention.

Hereinafter, embodiments of the invention will be described with reference to the accompanying drawings. It is to be noted that the same components in each embodiment are referred to with the same reference numerals. Descriptions of the components will only be given in the first embodiment, and are omitted in the subsequent embodiments.

Figure 2:
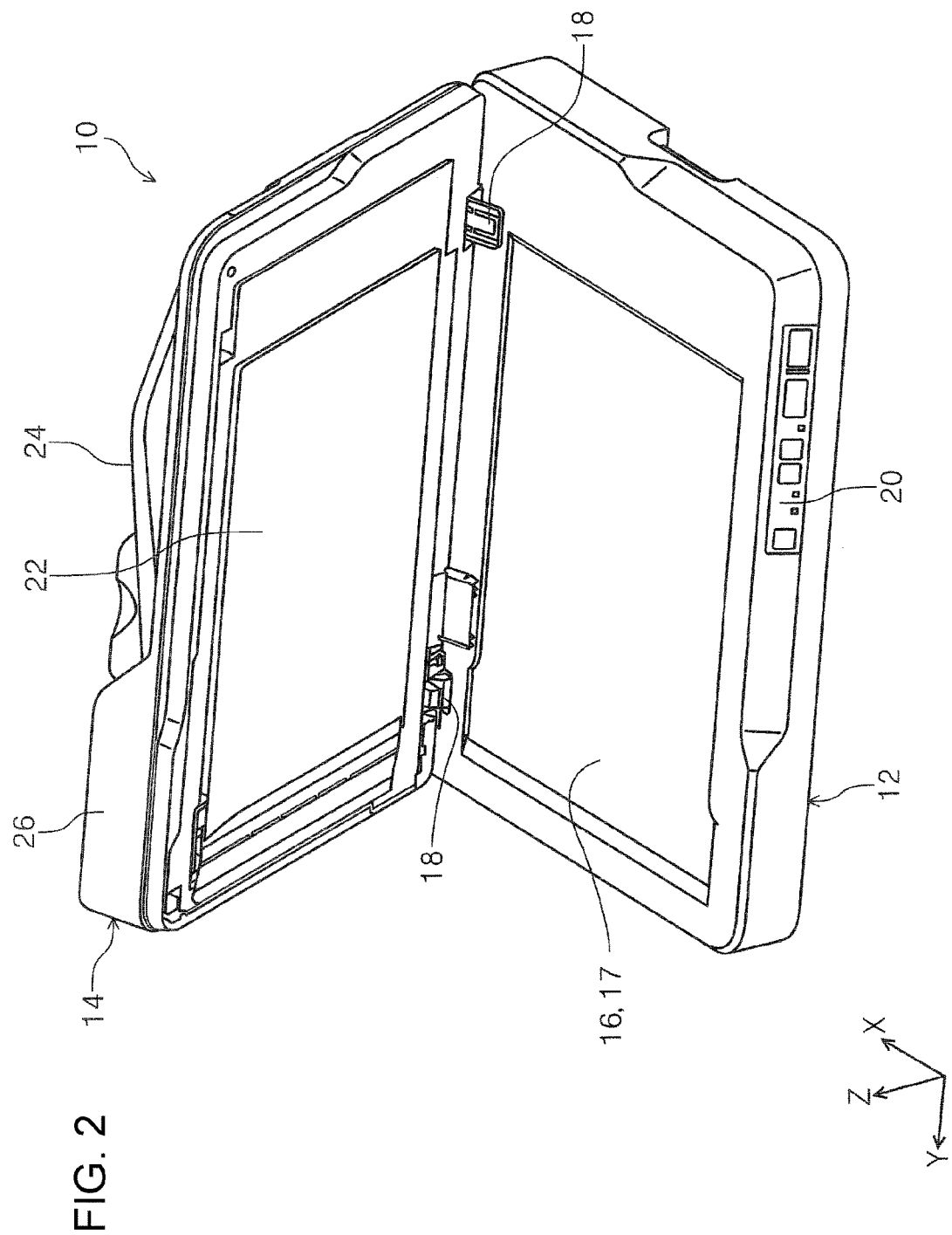
FIG. 2 is a perspective view showing a state in which an ADF is lifted open against the housing in the image reading apparatus according to the invention.
Figure 3:
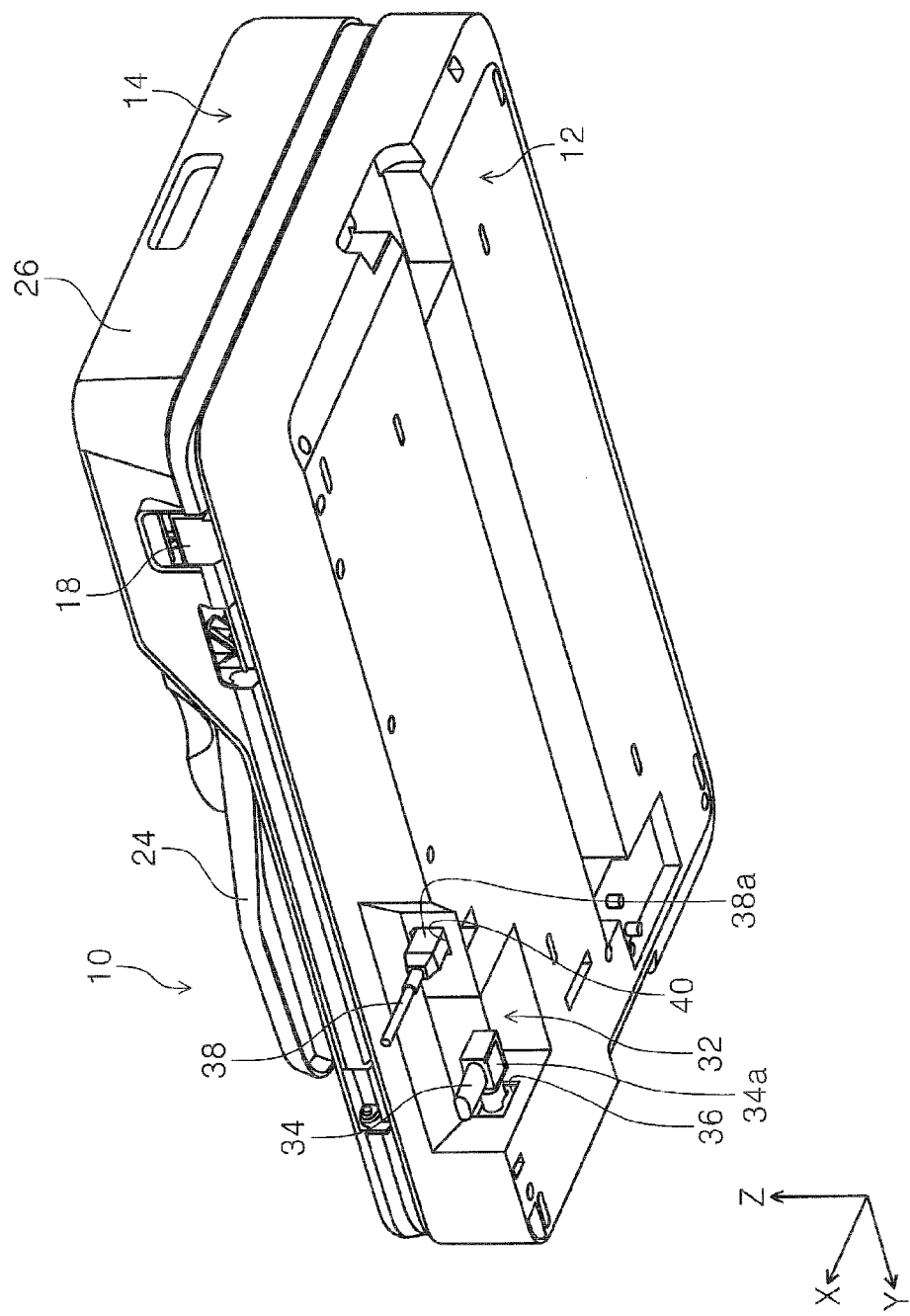
FIG. 3 is a perspective view of the image reading apparatus as seen from the lower side according to the invention.
Figure 4:
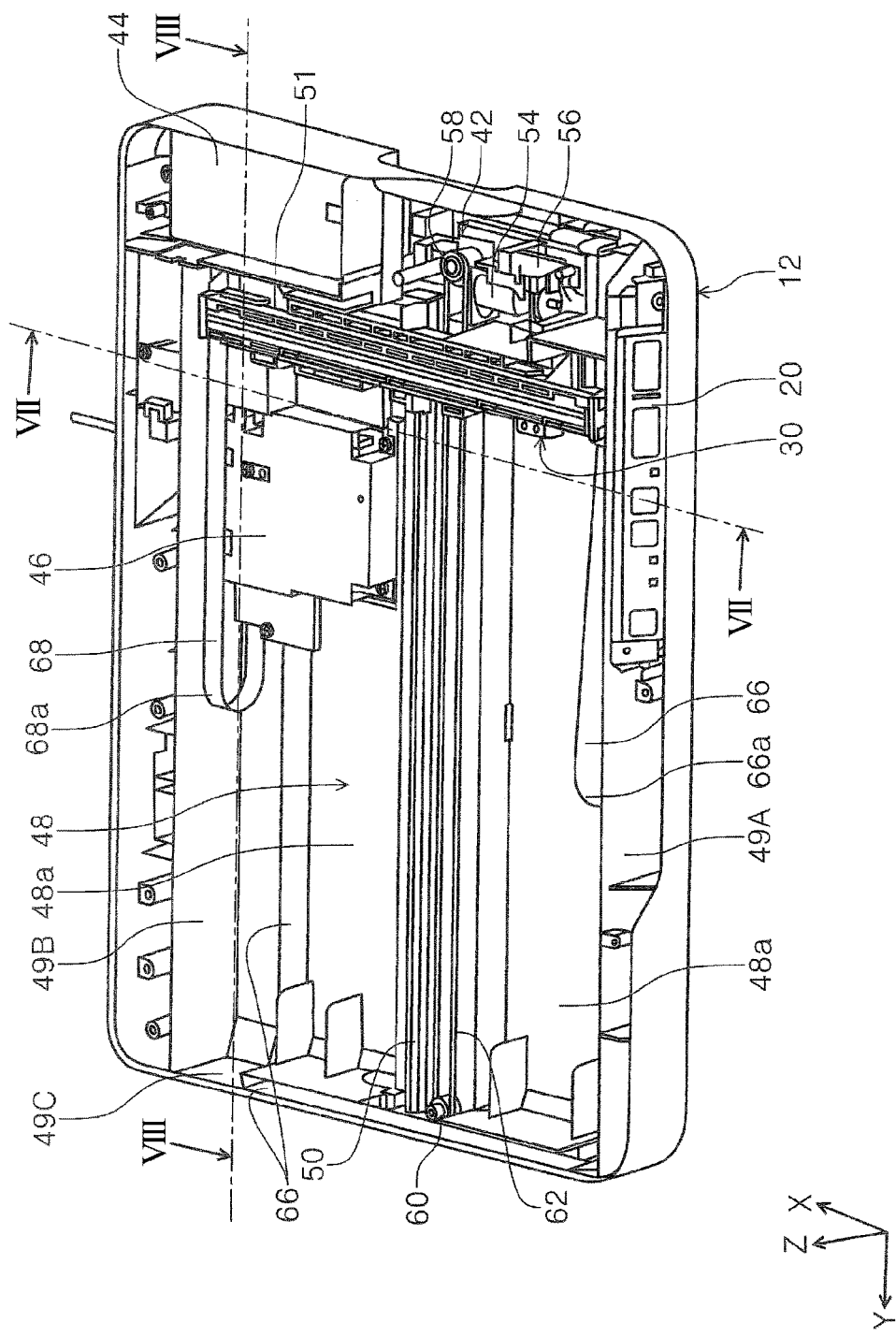
FIG. 4 is a perspective view showing the internal structure of the housing in the image reading apparatus according to the invention.
Figure 5:
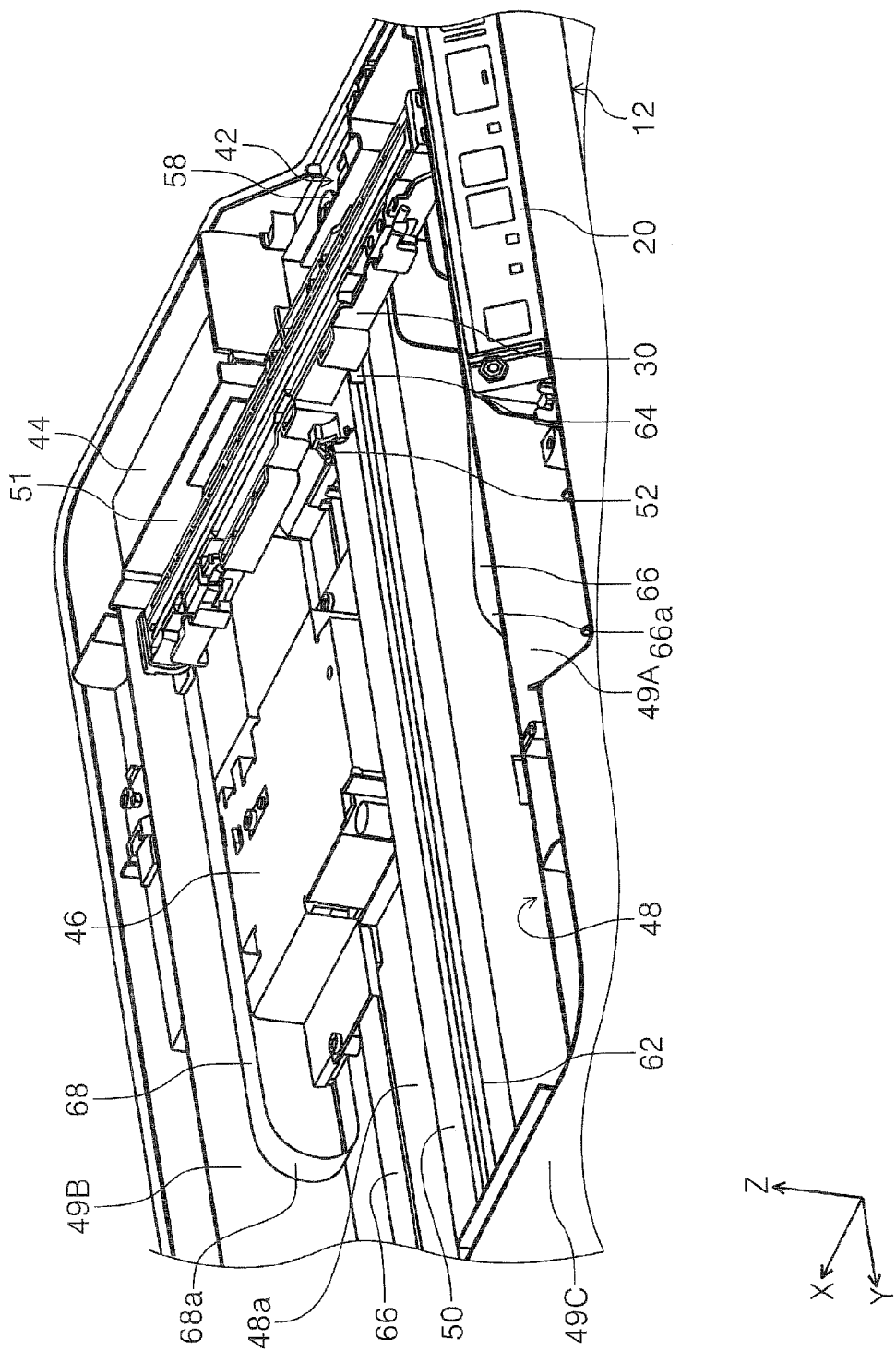
FIG. 5 is a perspective view of the inside surface of the housing as seen from the apparatus front side.
Figure 6:
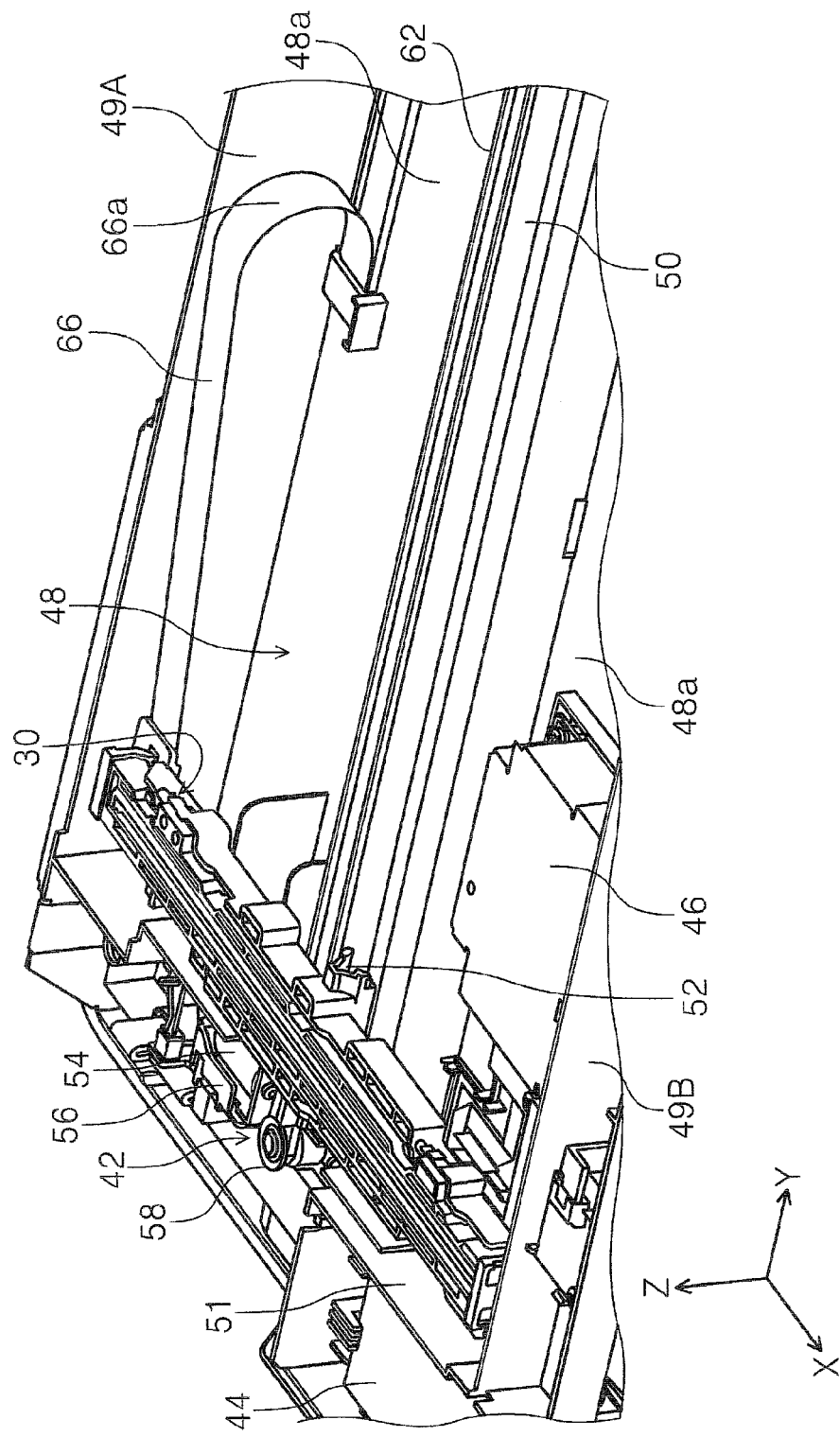
FIG. 6 is a perspective view of the inside surface of the housing as seen from the apparatus rear side.
Figure 7:
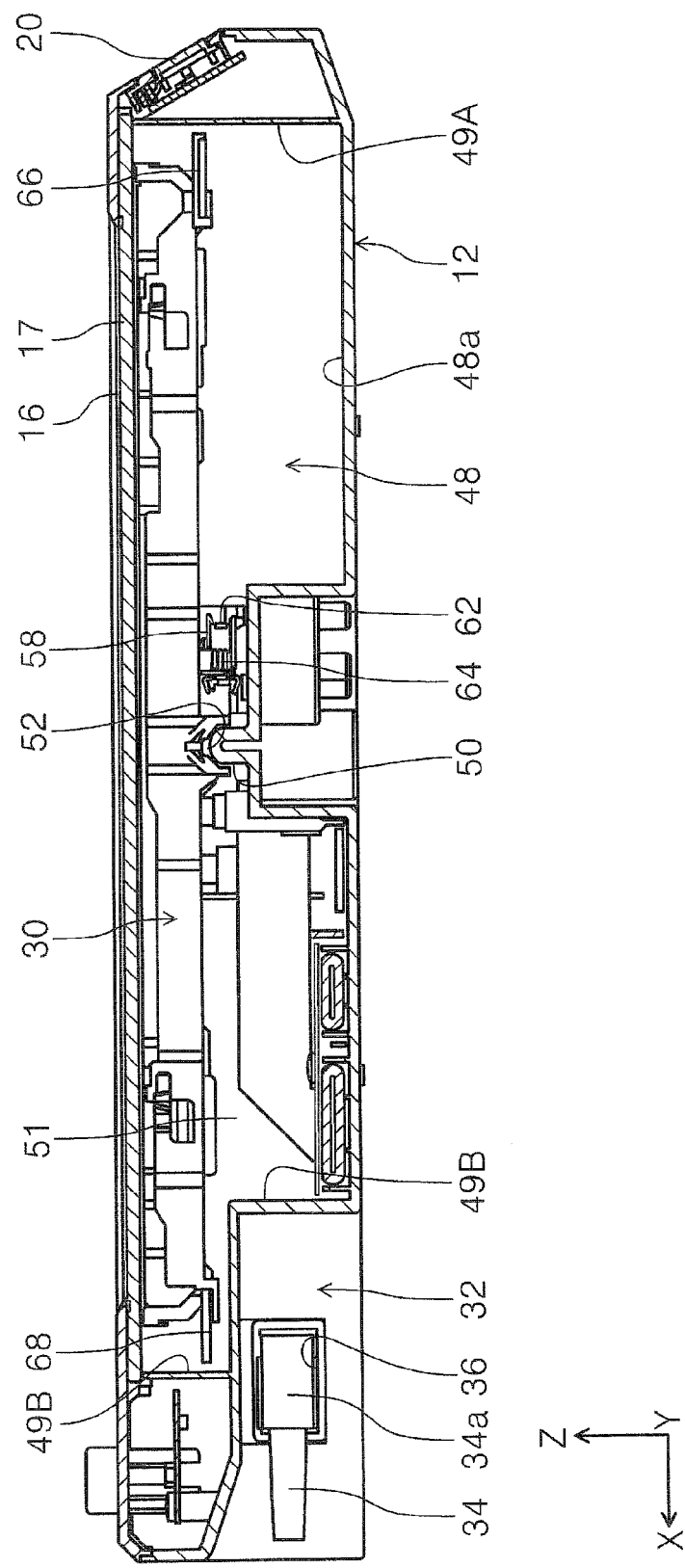
FIG. 7 is a sectional view of VII-VII in FIG. 4.
Figure 8:
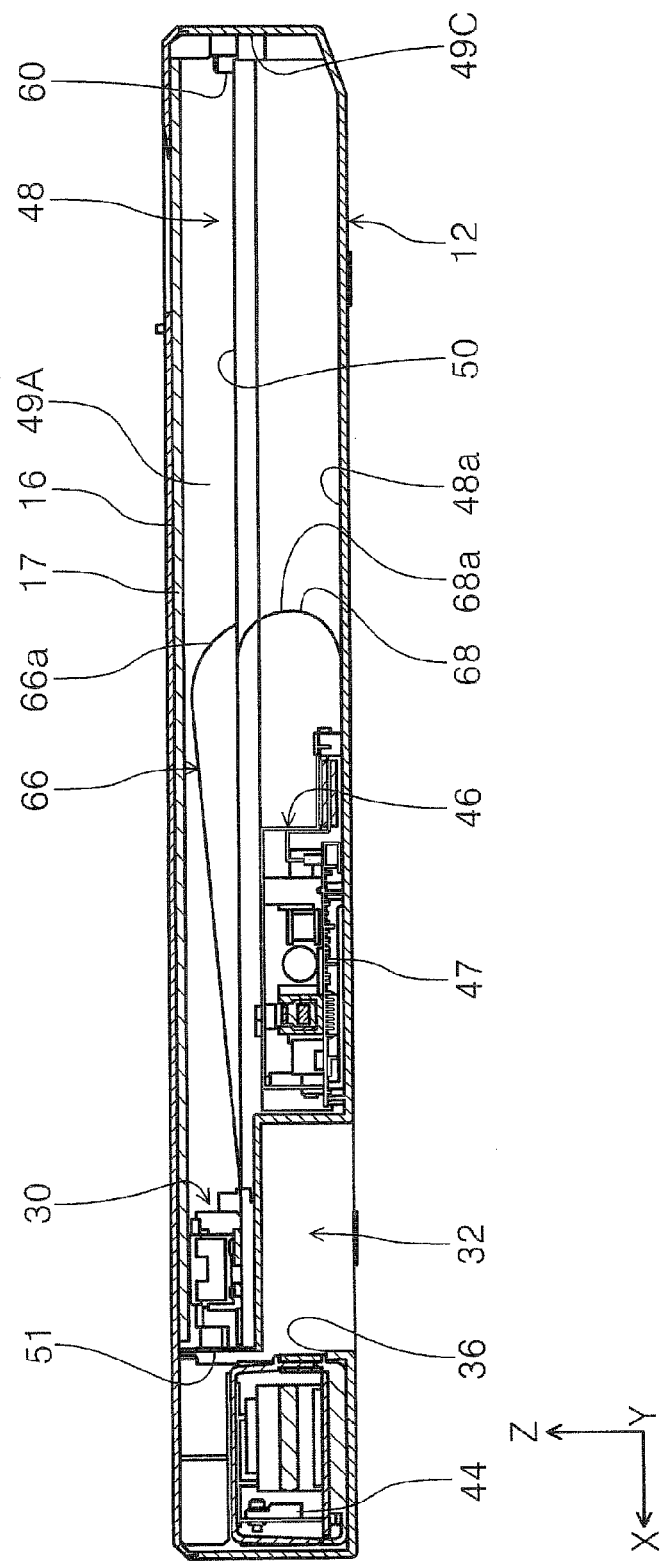
FIG. 8 is a sectional view of VIII-VIII in FIG. 4.

FIG. 1 is an external perspective view of an image reading apparatus according to the invention, FIG. 2 is a perspective view showing a state in which an ADF is lifted open against the housing in the image reading apparatus according to the invention, FIG. 3 is a perspective view of the image reading apparatus as seen from the lower side according to the invention, FIG. 4 is a perspective view showing the internal structure of the housing in the image reading apparatus according to the invention, FIG. 5 is a perspective view of the inside surface of the housing as seen from the apparatus front side, FIG. 6 is a perspective view of the inside surface of the housing as seen from the apparatus rear side, FIG. 7 is a sectional view of VII-VII in FIG. 4, and FIG. 8 is a sectional view of VIII-VIII in FIG. 4.

With the X-Y-Z-coordinate system illustrated in each drawing, the X direction indicates the main scanning direction of an image reading unit and the apparatus depth direction, the Y direction indicates the sub-scanning direction and the apparatus width direction, and the Z direction indicates the apparatus height direction. It should be noted that in the specification, the +X-axis direction side is the apparatus rear side, the −X-axis direction side is the apparatus front side, the −Y-axis direction side is the apparatus width direction right side, and the +Y-axis direction side is the apparatus width direction left side.

Outline of Image Reading Apparatus

With reference to FIGS. 1 to 3, an image reading apparatus 10 will be described. The image reading apparatus 10 includes a housing 12 and an automatic document feeder (ADF) 14 (referred to as "ADF 14" hereinafter). The ADF 14 is configured to be switchable between a closed position (see FIG. 1) against the placement surface 16 provided in the upper portion of the housing 12, and an open position (see FIG. 2) against the placement surface 16. More specifically, the ADF 14 is pivotably connected to the housing 12 via hinge sections 18 provided on the housing 12 on the apparatus rear side. In other words, the ADF 14 is opened or closed by pivoting it against the housing 12 with the edge portion of the apparatus front side as the free end.

The housing 12 includes the placement surface 16 and an operation section 20. The placement surface 16 is provided on the upper portion of the housing 12. In the embodiment, the placement surface 16 is formed as an upper surface of a flat and transparent glass plate 17. A medium may be placed on the placement surface 16.

Further, an edge portion on the −Y direction side of the placement surface 16 in the embodiment has been set, as an example, as a reference position in the apparatus width direction for a medium reading unit 30 to be described later reading a medium placed on the placement surface 16. A region surrounding the glass plate 17 is formed a step higher than the placement surface 16. Therefore, the medium may be positioned by abutting a medium corner against the edge portion of the −Y direction side of the placement surface 16.

Further, an operation section 20 is provided on the apparatus front side (−X-axis direction side in FIGS. 1 and 2) of the housing 12. The operation section 20 includes a power switch and setting buttons or the like for operating the image reading apparatus 10.

The ADF 14 includes a medium pressing member 22, a medium supporting tray 24, a medium transport section 26, and a medium ejection tray 28. The medium transport section 26 transports the medium supported by the medium supporting tray 24 in a state where the ADF 14 is closed against the housing 12 (see FIG. 1), and discharges the medium toward the medium ejection tray 28 after causing the medium reading unit 30 described later (see FIG. 4) to read the reading surface of the medium placed on the placement surface 16 provided on the upper portion of the housing 12 (see FIG. 2).

On the lower surface, that is, on the side facing the placement surface 16 of the ADF 14, the medium pressing member 22 is provided. The medium pressing member 22 is formed of an elastic body such as a sponge, for example. When the ADF 14 is in a closed position against the placement surface 16 (see FIG. 1), the medium pressing member 22 uniformly presses the medium placed on the placement surface 16 from the side opposite to the medium placement surface 16 so that the medium does not float from the placement surface 16. Then, the reading surface of the medium pressed by the medium pressing member 22 comes into close contact with the placement surface 16. The size of the medium pressing member 22 in the embodiment is set to a size that is able to press an area excluding an area for reading the medium transported by the medium transport section 26 in the placement surface 16.

As shown in FIG. 3, on the rear side surface of the housing 12, an insertion/extraction section 32 is provided as an "insertion/extraction space". The insertion/extraction section 32 is configured as a concave portion opened on the rear side surface of the housing 12. The insertion/extraction section 32 includes a first insertion/extraction opening 36 as an "insertion/extraction opening", attaching a plug 34a of a power cable 34 that supplies power to the image reading apparatus 10, and a second insertion/extraction opening 40 attaching a plug 38a of a communication cable 38 that connects an external device to the image reading apparatus 10. In the embodiment, the first insertion/extraction opening 36 opens in the apparatus width direction, and the second insertion/extraction opening 40 opens toward the apparatus rear side. Further, the first insertion/extraction opening 36 is provided at a position recessed from the apparatus rear side edge portion, that is, a position deviated toward the apparatus front side in the insertion/extraction section 32.

In the embodiment, the size of the apparatus width direction and the size of the apparatus depth direction in the insertion/extraction section 32 are set at sizes in which the plug 34a of the power cable 34 may be easily plugged into the first insertion/extraction opening 36 and the plug 38a of the communication cable 38 may be easily plugged into the second insertion/extraction opening 40.

Housing Configuration

Next, with reference to FIGS. 4 to 8, descriptions will be provided of a configuration of the housing 12. In addition to the placement surface 16 and the operation section 20 described above, the housing 12 includes a medium reading unit 30, a medium reading unit driver 42, a power supply 44, and a control section 46.

The medium reading unit 30 in the embodiment extends in the X-axis direction which is the main scanning direction, and corresponds to the length in the apparatus depth direction of the placement surface 16. The medium reading unit 30 in the embodiment is configured as an optical unit for reading information (image) of a medium placed on the placement surface 16, by receiving reflected light from the medium, onto which light is irradiated. The medium reading unit 30 is accommodated in the medium reading unit accommodation compartment 48, provided in the housing 12 as the "movement area of the medium reading unit".

Here, the medium reading unit accommodation compartment 48 will be described. The medium reading unit driver 42 includes a wall 49A, a wall 49B, a wall 49C, and a partition wall 51. The wall 49A extends in the apparatus width direction in the apparatus front side, the wall 49B extends in the apparatus width direction in the apparatus rear side, the wall 49C extends in the apparatus depth direction in the apparatus width direction left end, and connecting the walls 49A and 49B, and the partition wall 51 separates the power supply 44 and the medium reading unit accommodation compartment 48 in the apparatus width direction right side. The medium reading unit accommodation compartment 48 is formed as an area surrounded by the walls 49A, 49B, 49C, and the partition wall 51. Further, the walls 49A, 49B and the partition wall 51 in the embodiment support the glass plate 17 forming the placement surface 16 from the lower part in the height direction of the image reading apparatus.

The power supply 44 in the embodiment is arranged at the apparatus rear side, and on the apparatus width direction right end, in the housing 12. That is, the power supply 44 is arranged outside the apparatus width direction right end of the medium reading unit accommodation compartment 48. The partition wall 51 is connected to the wall 49B, extending toward the apparatus rear side, after extending toward the apparatus width direction left side across the front side of the power supply 44 from the apparatus width direction right end of the housing 12 with respect to the power supply 44. That is, the partition wall 51 separates the power supply 44 and the medium reading unit accommodation compartment 48. Therefore, dust having entered the first insertion/extraction opening 36 to the power supply 44 may be prevented from entering the medium reading unit accommodation compartment 48. Further, in the embodiment, the power supply 44 includes a rectifier circuit for converting an alternating current supplied from the power cable 34 into a direct current.

Further, the medium reading unit 30 is configured in a manner that the medium reading unit 30 is able to reciprocate in the apparatus width direction, which is the sub-scanning direction, by the medium reading unit driver 42 in the medium reading unit accommodation compartment 48. Further, in the medium reading unit accommodation compartment 48, a guide rail 50 extending in the apparatus width direction is provided in the central region in the apparatus depth direction. The guide rail 50 is engaged with a guided section 52 provided in the lower part of the medium reading unit 30 (see FIGS. 5 to 7).

The medium reading unit driver 42 includes a driving motor 54, a driving force transmitter 56, a driving pulley 58, a driven pulley 60, and a toothed belt 62. Further, at least a portion of the toothed belt 62 is gripped by a belt gripping section 64 (see FIG. 7) provided on the medium reading unit 30.

In the embodiment, the driving pulley 58 is provided at the apparatus width direction right end. Further, the driven pulley 60 is provided at the apparatus width direction left end in a manner that the driven pulley 60 is able to be driven with respect to the rotation of the driving pulley 58. Further, the toothed belt 62 is wound around the driving pulley 58 and the driven pulley 60.

The driving force transmitter 56 includes a plurality of gear wheels that transmit the driving force of the driving motor 54 to the driving pulley 58. Accordingly, the driving pulley 58 is rotationally driven, and the toothed belt 62 also rotates in response to the rotation of the driving pulley 58. As a result, the medium reading unit 30 is driven in the apparatus width direction by the medium reading unit driver 42. In this case, the medium reading unit 30 is moved in the apparatus width direction by being guided by the guide rail 50, since the guided section 52 and the guide rail 50 are engaged.

In FIG. 4, the position of the apparatus width direction left end in the medium reading unit accommodation compartment 48 corresponds to the reference position in the apparatus width direction for reading the medium placed on the placement surface 16. That is, in FIG. 4, the medium reading unit 30 is located at the home position for reading the medium placed on the placement surface 16 of the glass plate 17.

Further, in the embodiment, an analog signal transmission cable 66 extends from one end of the medium reading unit 30 which extends in the apparatus depth direction, that is, from the apparatus front side edge portion. A digital signal transmission cable 68 extends from the other end of the medium reading unit 30, that is, from the apparatus rear side edge portion.

In addition, in the bottom surface 48a of the medium reading unit accommodation compartment 48, the control section 46 is provided in an area further toward the apparatus rear side than the guide rail 50. Further, the control section 46 is configured so as to be electrically connectable to the communication cable 38 through the second insertion/extraction opening 40. In the embodiment, the control section 46 includes a circuit board 47 having a plurality of electronic components (see FIG. 8). The control section 46 controls the image reading operation in the image reading apparatus 10, controls the ADF 14, performs input processing from the operation section 20, and communicates with an external device.

The analog signal transmission cable 66 and the digital signal transmission cable 68 are electrically connected to the control section 46. In the embodiment, the analog signal transmission cable 66 and the digital signal transmission cable 68 have flexibility, form curved sections 66a and 68a, and are respectively connected to the medium reading unit 30. The analog signal transmission cable 66 and the digital signal transmission cable 68 deform following the operational movement of the medium reading unit 30 in the apparatus width direction.

In addition, the wiring of the analog signal transmission cable 66 and the digital signal transmission cable 68 in the medium reading unit accommodation compartment 48 will be described. As shown in FIG. 6, the analog signal transmission cable 66 extends leftwards in the apparatus width direction from the apparatus front side edge portion of the medium reading unit 30, forming the curved section 66a curving towards the apparatus height direction lower side. The analog signal transmission cable 66 changes its direction to the apparatus width direction right side by curving, engages with the bottom surface 48a of the medium reading unit accommodation compartment 48, and again changes its direction to the apparatus width direction left side. The analog signal transmission cable 66 extending in the apparatus width direction left side extends to the apparatus rear side along the wall 49C when abutting against the wall 49C (see FIG. 4).

When reaching the position where the control section 46 is provided in the apparatus depth direction, the analog signal transmission cable 66 extending along the wall 49C changes direction to the apparatus width direction right side towards the control section 46. Then, the analog signal transmission cable 66 is connected to the control section 46. In the embodiment, the analog signal transmission cable 66 is susceptible to noise. Therefore, the analog signal transmission cable 66 is drawn within the medium reading unit accommodation compartment 48, bypassing the power section 44 so as not to be affected by noise that the power section 44 emits.

The digital signal transmission cable 68 extends in the apparatus width direction left of the apparatus rear-side edge portion of the medium reading unit 30, curving downwards in the height direction of the image reading apparatus, to form a curved section 68a. Then, the digital signal transmission cable 68 extends from the curved section 68a to the apparatus width direction right side, and is connected to the control section 46.

Here, referring to FIGS. 7 and 8, the layout of the insertion/extraction section 32, the power supply 44, and the medium reading unit accommodation compartment 48 of the housing 12 will be described. In the embodiment, the insertion/extraction section 32 overlaps at least a portion of the medium reading unit accommodation compartment 48 in the height direction of the image reading apparatus.

Further, in the embodiment, as shown in FIG. 8, the insertion/extraction section 32 overlaps a part in which the curved sections 66a and 68a of the analog signal transmission cable 66 and the digital signal transmission cable 68 in the medium reading unit accommodation compartments 48 are being formed in the height direction of the image reading apparatus, that is, the area in which the analog signal transmission cable 66 and the digital signal transmission cable 68 deform following the operational movement of the medium reading unit 30. Further, the insertion/extraction section 32 overlaps at least a portion of the circuit board 47 of the control section 46 in the height direction of the image reading apparatus.

Referring to FIG. 4, the power supply 44 overlaps at least a portion of the medium reading unit driver 42 in the apparatus width direction. In the embodiment, the power supply 44 overlaps at least a portion of the driving motor 54 of the medium reading unit driver 42 in the apparatus width direction.

Embodiment Modification

1. In the embodiment, the power supply 44 is configured to include a rectifier circuit. However, the power supply 44 may further include a battery.

2. In the embodiment, the medium reading unit driver 42 is configured to move in the apparatus width direction by a toothed belt 62. Instead, the medium reading unit 30 may be moved with a rack-pinion or the like in place of this configuration.

3. In the embodiment, the image reading apparatus 10 is configured to include the ADF 14. Instead of this configuration, the image reading apparatus 10 may include an open/closeable cover in place of the placement surface 16.

To summarize the above description, the image reading apparatus 10 includes the medium reading unit 30, the signal transmission cables 66 and 68, the power supply 44, and the housing 12. The medium reading unit 30 reads an image of a medium as the medium moves in the apparatus width direction while extending in the apparatus depth direction. The signal transmission cables 66 and 68 are cables having flexibility, forming the curved sections 66a and 68a, connecting to the medium reading unit 30, and following the deformation along with the movement of the medium reading unit 30. The power supply 44 supplies power to the medium reading unit 30. The housing 12 houses the medium reading unit 30 and the power supply 44. In the height direction of the medium reading unit 30, at least a portion of the insertion/extraction section 32 and at least a portion of the medium reading unit accommodation compartment 48 overlap. The insertion/extraction section 32 allows the plug 34a of the power cable 34 to be inserted/extracted from the outside surface of the housing 12 to the power supply 44. The signal transmission cables 66 and 68 deform following the operational movement of the medium reading unit in the medium reading unit accommodation compartment 48.

According to the above configuration, in the height direction of the image reading apparatus, at least a portion of the insertion/extraction section 32 that allows the plug 34a of the power cable 34 to be inserted/extracted from the outside surface of the housing 12 to the power supply 44 and at least a portion of the medium reading unit accommodation compartment 48 in which the signal transmission cables 66 and 68 deform following the operational movement of the medium reading unit overlap. Therefore, in the image reading apparatus 10 incorporating the power supply 44 in the housing 12, it is possible to further reduce the thickness of the apparatus by avoiding the superimposition of the insertion/extraction section 32 and the medium reading unit accommodation compartment 48, thus reducing the dimension in the height direction of the image reading apparatus.

The signal transmission cables 66 and 68 include the analog signal transmission cable 66 extending from the front side edge portion of the apparatus depth direction and the digital signal transmission cable 68 extending from the rear side edge portion of the apparatus depth direction in the medium reading unit 30. The signal transmission cables 66 and 68 include a circuit board 47 to which the analog signal transmission cable 66 and the digital signal transmission cable 68 are connected. The analog signal transmission cable 66 is connected to the circuit board 47 via a bypass path distant from the power supply 44.

According to the above configuration, the analog signal transmission cable 66 is connected to the circuit board 47 via the bypass path distant from the power supply 44. Therefore, upon transmission of analog signals susceptible to the influence of noise, it is possible to suppress the influence of the noise originating from the power supply 44. Thus, it is possible to perform more efficient signal transmission.

Further, in the height direction of the image reading apparatus, at least a portion of the insertion/extraction section 32 and at least a portion of the circuit board 47 overlap. According to this configuration, it is possible to avoid the superimposition of the insertion/extraction section 32 and the circuit board 47 so that the height of the apparatus may be reduced. Therefore, it is possible to further reduce the thickness of the apparatus.

The power supply 44 is arranged outside the apparatus width direction right end of the medium reading unit accommodation compartment 48 in the apparatus width direction. At least a portion of the driving motor 54 for driving the medium reading unit 30 and at least a portion of the power supply 44 overlap in the apparatus width direction.

According to the above configuration, at least a portion of the driving motor 54 for driving the medium reading unit 30 and at least a portion of the power supply 44 overlap in the apparatus width direction. Therefore, it is possible to avoid the superimposition of the driving motor 54 and the power supply 44 in the apparatus width direction, and to further reduce the thickness of the apparatus.

Further, in the image reading apparatus 10, the first insertion/extraction opening 36 provided in the insertion/extraction section 32 to which the plug 34a of the power cable 34 is inserted/extracted is provided at a position recessed from the side surface of the housing 12.

According to the above configuration, the first insertion/extraction opening 36 provided in the insertion/extraction section 32 to which the plug 34a of the power cable 34 is inserted/extracted is provided at a position recessed from the side surface of the housing 12. Therefore, protrusion of the plug 34a from the side surface of the housing 12 may be avoided, or it is possible to reduce the amount of protrusion of the plug 34a. As a result, the side surface of the housing 12 may be shifted towards a wall surface or the like, making it possible to decrease the amount of space required to install the apparatus.

Further, the first insertion/extraction opening 36 opens in the apparatus width direction which is a direction intersecting the side surface of the housing 12 in which the insertion/extraction section 32 is provided. According to this example, the first insertion/extraction opening 36 opens in the apparatus width direction which is a direction intersecting the side surface of the housing 12 in which the insertion/extraction section 32 is provided. Therefore, protrusion of the plug 34a from the side surface of the housing 12 may be more reliably avoided, or the amount of protrusion of the plug 34a may be further reduced. As a result, it is possible to further decrease the amount of space required to install the apparatus.

Further, the housing 12 is provided with a partition wall 51 in the interior that separates the arrangement region of the medium reading unit accommodation compartment 48 and the power supply 44 while surrounding the medium reading unit accommodation compartment 48.

The power supply 44 is liable to become an entry section through which dust and the like enter the apparatus, because of the insertion and extraction of the plug 34a of the power cable 34. However, according to the configuration described above, the housing 12 is provided with a partition wall 51 in the interior that separates the arrangement region of the medium reading unit accommodation compartment 48 and the power supply 44 while surrounding the medium reading unit accommodation compartment 48. Therefore, it is possible to suppress the entry of dust or the like into the interior of the medium reading unit 30 from the power supply 44. Thus, the apparatus may be maintained in an efficient condition.

The invention is not limited to the foregoing embodiments thereof, and may be modified in various ways as far as such modifications lie within the scope of the invention hereinafter defined. It is needless to say that such modifications lie in the scope of the invention.

The entire disclosure of Japanese Patent Application No. 2015-223675, filed Nov. 16, 2015 is expressly incorporated by reference herein.

What is claimed is:

1. An image reading apparatus comprising:
   a medium reading unit that extends in a main scanning direction and reads an image of a medium while moving in a sub-scanning direction which is a direction crossing the main scanning direction;
   a signal transmission cable that is a flexible cable having a curved section and connected to the medium reading unit and that deforms following an operational movement of the medium reading unit;
   a power supply that supplies power to the medium reading unit; and
   a housing that accommodates the medium reading unit and the power supply,
   wherein at least a portion of an insertion/extraction space for inserting/extracting a plug of a power cable from outside the housing to the power supply and at least a portion of an area in which the signal transmission cable deforms following the operational movement of the medium reading unit overlap in a height direction of the medium reading unit.

2. The image reading apparatus according to claim 1, further comprising:
   a circuit board, wherein the signal transmission cable includes an analog signal transmission cable extending from one side of the medium reading unit in the main scanning direction and a digital signal transmission cable extending from an other side of the medium reading unit in the main scanning direction;

the analog signal transmission cable and the digital signal transmission cable are connected to the circuit board; and the analog signal transmission cable is connected to the circuit board via a bypass path distant from the power supply.

3. The image reading apparatus according to claim 2, wherein at least a portion of the insertion/extraction space and at least a portion of the circuit board overlap in the height direction of the image reading apparatus.

4. The image reading apparatus according to claim 2, wherein the power supply is arranged outside a movement area of the medium reading unit in the sub-scanning direction, and wherein at least a portion of a motor for driving the medium reading unit and at least a portion of the power supply overlap in the sub-scanning direction.

5. The image reading apparatus according to claim 2, wherein an insertion/extraction opening provided in the insertion/extraction space to which a plug of the power cable is inserted/extracted is provided at a position recessed from a side surface of the housing.

6. The image reading apparatus according to claim 5, wherein the insertion/extraction opening opens in a direction intersecting the side surface of the housing in which the insertion/extraction space is provided.

7. The image reading apparatus according to claim 2, wherein the housing includes a partition wall in an interior that separates a movement area of the medium reading unit and an arrangement region of the power supply while surrounding the movement area of the medium reading unit.

8. The image reading apparatus according to claim 1, wherein the power supply is arranged outside a movement area of the medium reading unit in the sub-scanning direction, and wherein at least a portion of a motor for driving the medium reading unit and at least a portion of the power supply overlap in the sub-scanning direction.

9. The image reading apparatus according to claim 1, wherein an insertion/extraction opening provided in the insertion/extraction space to which a plug of the power cable is inserted/extracted is provided at a position recessed from a side surface of the housing.

10. The image reading apparatus according to claim 9, wherein the insertion/extraction opening opens in a direction intersecting the side surface of the housing in which the insertion/extraction space is provided.

11. The image reading apparatus according to claim 1, wherein the housing includes a partition wall in an interior that separates a movement area of the medium reading unit and an arrangement region of the power supply while surrounding the movement area of the medium reading unit.

* * * * *